Dec. 8, 1925.  G. M. RILEY  1,564,624
BASKET BALL VALVE
Filed July 6, 1922
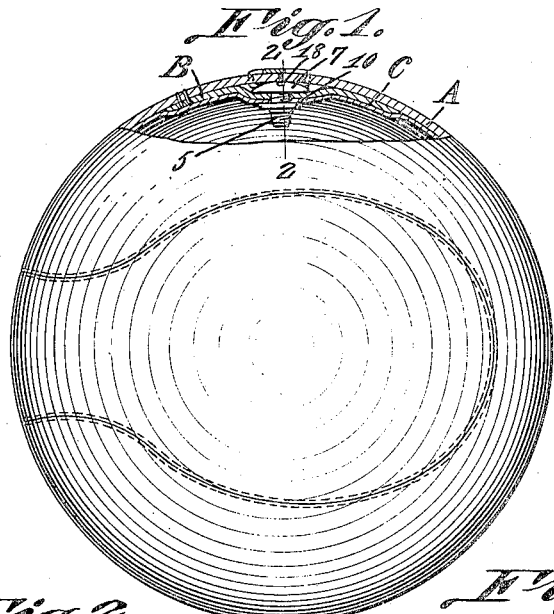
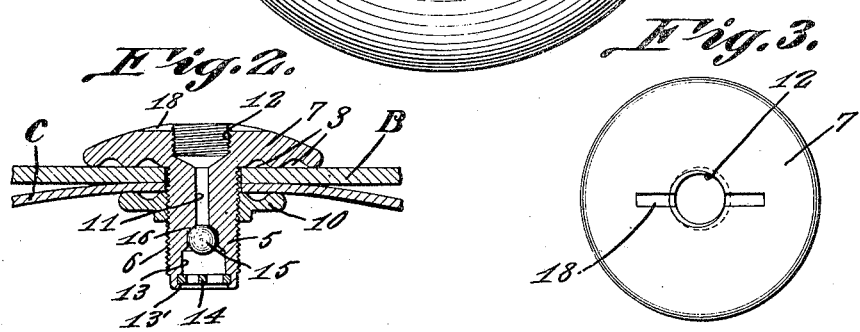
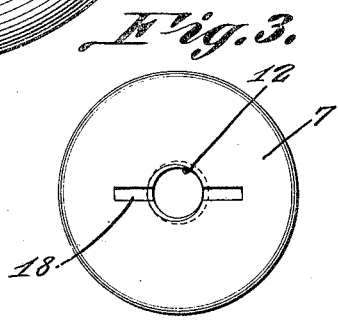
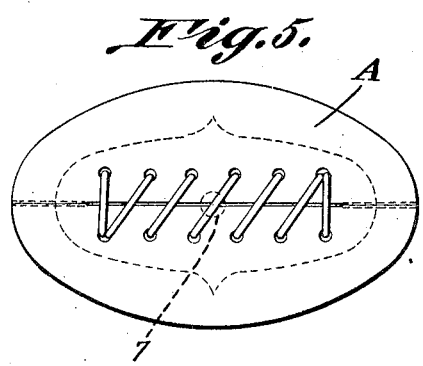
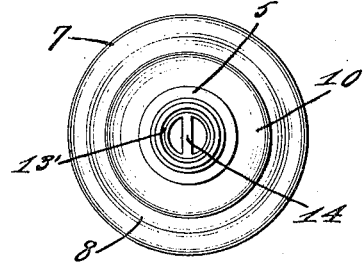
G. M. Riley, Inventor Patented Dec. 8, 1925.

1,564,624

UNITED STATES PATENT OFFICE.

GEORGE M. RILEY, OF AURORA, ILLINOIS.

BASKET-BALL VALVE.

Application filed July 6, 1922. Serial No. 573,133.

*To all whom it may concern:*

Be it known that I, GEORGE M. RILEY, a citizen of the United States, residing at Aurora, in the county of Kane and State of Illinois, have invented a new and useful Basket-Ball Valve, of which the following is a specification.

This invention relates to valve constructions, and more particularly to a valve construction especially designed for use in connection with pneumatic balls such as basket balls, foot balls and the like.

The primary object of the invention is to provide a ball valve which may be readily and easily applied to pneumatic balls now in use, the structure of the valve body being such as to grip the walls of the opening in the ball in which the valve is positioned, in a manner to insure an airtight connection between the valve and ball.

A still further object of the invention is to provide a valve which will eliminate any possibility of the air passing from the ball in which the same is positioned, prior to the positioning of the valve cap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is an elevational view of a ball, the same being partly broken away to illustrate the valve as positioned therein.

Figure 2 is a sectional view through the valve.

Figure 3 is a plan view thereof.

Figure 4 is a bottom plan view of the valve.

Figure 5 is an elevational view disclosing a ball supplied with a valve showing the cover flap as positioned thereover.

Referring to the drawing in detail. the ball casing is indicated at A and the bladder indicated at B, while the cover flap or tongue is indicated at C.

The valve forming the essence of the invention includes a body portion 5 formed with threads 6 on the periphery thereof, which threads extend throughout the entire length of the body.

A head 7 is formed integral with the body and has grooves 8 provided in one surface thereof, which grooves accommodate portions of the casing A to insure a fluid-tight connection between the head and ball casing when the head is clamped in position.

Cooperating with the head 7 is a clamping member 10 which has interior threads moving over the threads 6 of the body portion to cause the member 10 to move into clamping relation with the head 7 and clamp a portion of the inner tube, or bladder B and protecting flap C therebetween. The body portion 5 is formed with a central bore 11 which bore provides communication between the enlarged opening 12 in the head and the enlarged opening 13 at the opposite end of the body portion 5. Positioned in the opening 13 and held therein by means of the flange 13' is a circular guard formed with a central bar 14 adapted to guard the ball valve 15 and prevent the same from falling from the valve body.

A portion of the valve body is cut away and formed with inclined walls 16 providing a valve seat whereby the ball may move into close engagement with the walls under the pressure within the ball to insure a fluid-tight seating of the ball valve. The head 7 is formed with cut out portions 18 to permit a blade of a tool to be inserted therein, to rotate the head 7 and accomplish the positioning of the same.

It might be further stated that the wall of the opening 15 is threaded to accommodate the threaded extension of a pump, so that the pump may be held to the valve while the ball is being inflated.

Having thus described the invention, what is claimed as new is:—

A valve member comprising a body portion and a head, said body portion being threaded throughout its length and having a bore extending therethrough, the outer end of the bore being enlarged and threaded, the inner end of the bore being enlarged and constructed to provide an enlarged opening, and a contracted portion, said contracted portion adapted to accommodate a ball valve in a manner to restrict lateral movement of the ball valve, a guard positioned at one end of the bore and having a central bar providing a rest for the ball valve, and means operating over the threaded portion of the body to cooperate with the head for clamping the valve body in position, and a removable plug positioned in the threaded portion of the bore.

In testimony that I claim the foregoing as my own, I have hereto affixed my signature.

GEORGE M. RILEY.